UNITED STATES PATENT OFFICE.

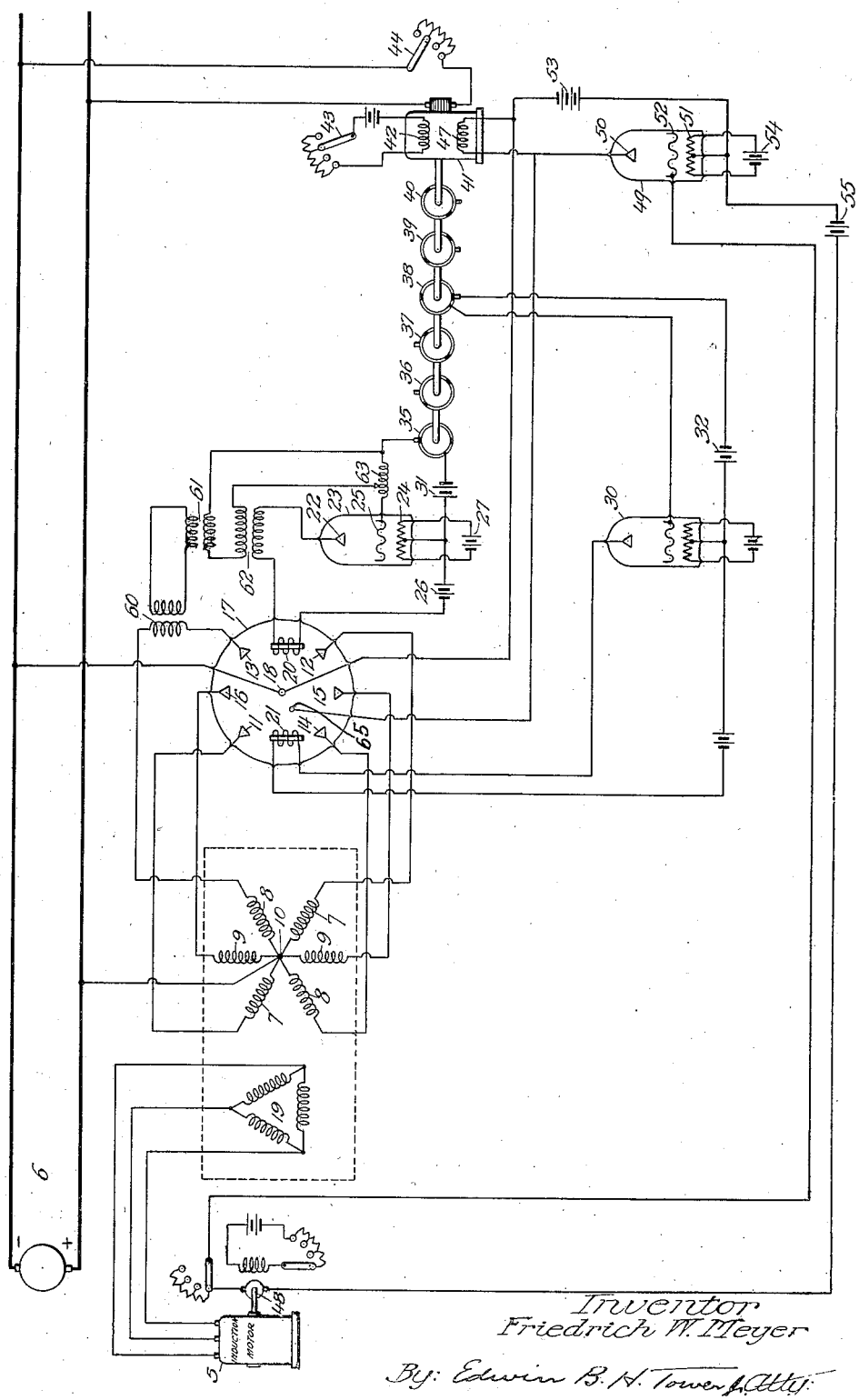

FRIEDRICH WILHELM MEYER, OF MILWAUKEE, WISCONSIN, ASSIGNOR TO THE CUTLER-HAMMER M'F'G CO., OF MILWAUKEE, WISCONSIN, A CORPORATION OF WISCONSIN.

OPERATION, REGULATION, AND CONTROL OF DYNAMO-ELECTRIC MACHINES.

1,408,758.     Specification of Letters Patent.     Patented Mar. 7, 1922.

Application filed January 21, 1918. Serial No. 212,948.

*To all whom it may concern:*

Be it known that I, FRIEDRICH WILHELM MEYER, a citizen of the German Empire, residing at Milwaukee, in the county of Milwaukee and State of Wisconsin, have invented new and useful Improvements in Operation, Regulation, and Control of Dynamo-Electric Machines, of which the following is a specification.

This invention relates to the operation, regulation and control of dynamo electric machines and more particularly to the operation of alternating current machines from a direct current source.

It is at present the general practice to employ rotary convertors or motor generator sets to convert direct current into alternating current when it is desired to operate alternating current machines from a direct current source. Such convertors and motor generator sets must often be very large, their size depending upon the amount of power to be converted. Their use results in appreciable losses and when of large size require much space for their accomplishment.

One of the objects of this invention is to provide improved methods and means of operating alternating current dynamo electric machines from the direct current source.

Another object is to provide improved means for regulating and controlling the dynamo electric machines of such a system.

Another object is to provide improved and smaller apparatus for operating alternating current machines from a direct current source.

Other objects and advantages of the invention will appear from the following description and claims.

In the accompanying drawing one embodiment of the invention is diagrammatically illustrated and it will be herein explained as applied to the operation, regulation and control of a three phase induction motor. The invention, however, is readily susceptible of other embodiments and of being adapted to operate, regulate and control other types of alternating current dynamo electric machines.

In accordance with the embodiment as employed to operate, regulate and control an induction motor, the rotary field for the motor is supplied from a direct current source by an electroionic valve whose discharges are so governed that properly phase displaced voltages are impressed upon the primary windings of the motor. The electroionic discharges may be so controlled as to give any desired phase or frequency characteristics and may be automatically regulated to maintain substantially constant motor speeds under varying load conditions, etc.

In the drawing a three phase induction motor 5 is to be driven from a direct current source of supply 6. The motor may be considered as provided with a Y or star wound primary and a squirrel cage or slip ring secondary with the brushes connected together. The motor primary is connected through a transformer and an electroionic valve to the direct current source of supply. The motor primary terminals are connected to the transformer secondary windings 19 which are illustrated as arranged in the usual delta or star formation. The common point 10 of the transformer primaries is connected to the positive supply line. The two outside terminals of reactances 7, 8 and 9 are also respectively connected to the pairs of anodes 11—12, 13—14 and 15—16 of electroionic valve 17. The electroionic valve may consist of an exhausted container provided with a common cathode 18, a plurality of anodes 11 to 16 inclusive, and an electromagnet for each anode arranged to influence its discharge path. The common cathode 18, of the valve 17 which as illustrated is of the usual arc discharge type, is connected to the negative supply line.

Assuming that the three primaries 7, 8 and 9 are electrically and magnetically similar to each other and that the drop in the discharges between the anodes 11, 12, 13, 14, 15 and 16 and the cathode 18 are the same the energy from the positive supply line would be divided into three equal parts passing through the transformer primary windings and the respective discharges through cathode 18 to the negative supply line. Since under this condition the voltage between the various terminals of the transformer primary windings will be zero, no voltages will be induced in the transformer secondary 19 and no current will flow in the motor primary circuit. If, however, the voltage drop in one of the discharges between an anode and cathode 18 were altered then a difference of potential would be set up between the various terminals of the transformer primary windings and voltages would be induced in the transformer secondary and consequently between the terminals of the motor primary, causing current to flow through one of the motor primary windings.

The means for materially altering the discharge between the various anodes 11, 12, 13, 14, 15 and 16, and the cathode 18 comprises a plurality of electromagnets under the control of electroionic valves or relays. These electromagnets are sequentially energized so that one after the other the discharge paths between the anodes and the common cathode are affected to produce successively voltages between the terminals of the various motor primary windings.

Since the electromagnets and the electroionic relays for each discharge path are similar in construction, function and operation only one set, for example, that controlling the discharge paths between anode 13 and cathode 18, and anode 14 and cathode 18, need be shown and described. The discharge between anode 13 and cathode 18 provides for the necessary voltage for one half wave of one cycle of the alternating current for the motor and the discharge between anode 14 and cathode 18 provides for the other half wave.

An electromagnet 20 is positioned to affect and thus control the electroionic discharge between anode 13 and cathode 18, and an electromagnet 21 similarly controls the discharge between anode 14 and cathode 18. One of the terminals of electromagnet 20 is connected to an anode 22 of an electroionic relay 23. Electroionic relay 23 has a cathode 24 and an auxiliary anode 25 which may take the form of a grid. The middle of cathode 24 is connected to the other terminal of electromagnet 20 through a battery 26. Cathode 24 is heated by current from a battery 27. By altering the discharge or voltage consumption of relay 23 the energization of electromagnet 20 may be varied to vary the discharge between anode 13 and cathode 18. In a like manner a similar electroionic relay 30 controls the energization of electromagnet 21 to influence the discharge between anode 14 and cathode 18 for the other half wave. A supplemental voltage is impressed at the proper intervals between supplementary anode 25 and cathode 24 of relay 23 and similarly for relay 30. This is accomplished by regularly completing circuits of a pair of batteries 31 and 32 respectively to the supplementary anodes and the cathodes of relays 23 and 30. For this purpose there is provided a circuit interrupter having a plurality of circuits interrupting discs 35, 36, 37, 38, 39 and 40. These discs are driven by a small direct current motor 41 which derives its operating current from line 6. Motor 41 is provided with a separately excited main field 42 whose energization may be adjusted by a rheostat 43. A rheostat 44 in the armature leads of motor 41 may be used for speed adjustment. Each disc 35 to 40 inclusive is divided into two segments, one of which is connected to its respective battery and electroionic relay as will be hereinafter described, the other segment being dead. The direction of rotation is assumed to be that indicated by the arrow and the segments are so related with respect to each other that the live segments are engaged by their respective brushes, for the pulses in the opposite direction, in the proper order and time for the proper phase relation. In the three phase relation shown the live segment of disc 36, or the segment of the disc associated with an electroionic relay is 60 electrical degrees ahead of the live segment of disc 35. The live segment of disc 37 is 60 electrical degrees ahead of the live segment of disc 36. Similarly the segments of discs 38, 39 and 40 are displaced relative to each other to give the proper phase relation.

Motor 41 is also provided with a supplementary field 47 controlled by a small direct current generator or tachometer machine 48 through an electroionic relay 49. Tachometer 48 has a variable separately excited field and is driven by and therefore simulates the operation of motor 5. Relay 48 has an anode 50, a cathode 51 and a supplementary anode 52 which may take the form of a grid. Auxiliary field 47 is connected to anode 50 and the middle of cathode 51 through a battery 53. Cathode 51 is heated by current from a battery 54. The terminals of the tachometer machine 48 are connected to auxiliary anode 52 and the middle of cathode 51 of relay 49 through a battery 55. The voltages of the tachometer and battery 55 are opposed, the tachometer voltage normally predominating.

The operation of motor 41 and the discs 35 to 40 inclusive driven thereby successively vary the voltages impressed between the auxiliary anodes and cathodes of the electroionic relays controlling the electromagnets influencing the discharges in valve 17. These relays therefore successively exert through their corresponding discharge control electromagnets a powerful effect upon the discharges between anodes 11, 12, 13, 14, 15 and 16, and cathode 18 to quickly extinguish, quench or otherwise alter the arcs. Voltages are thereby successively impressed between the terminals of the motor primary windings, a revolving field is set up in the motor and the motor operates. By changing the speed of motor 41 the frequency of the voltages impressed upon the windings of motor 5 may be varied at will.

Motor 5 is automatically maintained at a substantially constant speed under varying load conditions, etc. through the influence of tachometer machine 48. If the motor decreases in speed tachometer machine 48 simulating the operation of the machine also decreases in speed producing a lower voltage. The difference between the tachometer voltage and the voltage of battery 55 therefore decreases and less voltage is impressed between supplementary anode 52 and cathode 51 of relay 49. The voltage consumed in relay 49 therefore is instantaneously increased and less current flows through the supplementary field windings 47 of small motor 41 and since the two fields of this motor are arranged so that their effects are cumulative the field of the motor is quickly and sharply weakened. Motor 41 therefore increases in speed causing the supplementary voltages between the auxiliary anodes and the cathodes of the electroionic relays to be applied more rapidly. This causes the powerful effects upon the discharges between anodes 11, 12, 13, 14, 15 and 16 and cathode 18 of the main electroionic valve 17 to be more rapidly applied, the arcs are more quickly quenched and transferred, and the frequency of alteration of the discharges in the main valve is increased. This increases the frequency of the application of voltages across the terminals of the primary windings of the motor 5 and the speed of this motor increases.

An increase in the speed of motor 5, due to changes in load, etc., produces the opposite effect. The tachometer generates a higher voltage, less voltage is consumed in relay 49, the field of the auxiliary motor 41 is increased and its speed is accordingly decreased. The frequency of the application of the supplementary voltages between the auxiliary anodes and cathodes of the electroionic relays is accordingly decreased and the frequency of the alterations of the discharges in the main electroionic valve 14 is decreased. The frequency of the voltages impressed upon the primary windings of the motor 5 therefore decreases and the speed of the motor is decreased.

In order to improve the wave form and compensate for variations in the load current required by the motor the electroionic relays controlling the electromagnets for influencing the discharges in valve 17 may be brought under the influence of the load current. This is accomplished for one half pulse by placing a transformer 60 in the lead between anode 13 and motor 5. The secondary of transformer 60 is connected to the primary of a second transformer 61. In the secondary circuit of transformer 61 are two transformers 62 and 63. Transformer 62 is in the circuit between electromagnet 20 and relay 23 while transformer 63 is in the circuit between disc 35 and relay 23. These transformers may be two coil transformers or autotransformers as shown for transformer 63 and may be made adjustable. It is considered that ordinarily the best results are obtained by arranging transformers 62 and 63 so that their effects are in the same direction as the effects produced by relay 23. Similar apparatus would be provided for the other discharge paths. By such an arrangement the quenching or diminution of the arcs in valve 17 is more quickly and readily accomplished and the ending of the current pulsations can be made more abrupt. Also the magnetic fields of the arc varying electromagnets is more quickly and readily diminished or killed and therefore the arcs can form more readily and the beginning of the pulses is made more certain and abrupt.

If for any reason all of the arcs of valve 17 should be extinguished the operation would immediately cease. To guard against such a contingency it may be desirable in some instances to provide means for restarting the arcs. This may be accomplished by providing a supplementary anode 65 for one of the discharge paths of valve 17. Supplementary anode 65 and cathode 18 are connected across the leads between relay 49 and the auxiliary field 47 of motor 41. Should the arcs all be extinguished the speed of motor 5 would immediately sharply decrease. The difference between the voltages of tachometer 48 and battery 55 would sharply increase resulting in a high voltage in relay 49. A comparatively high voltage would therefore obtain between supplementary anode 65 and cathode 18 and an arc would form therebetween. The arc between these two points woud readily pass to electrodes 14 and 18 and the cycle of operations hereinbefore described would recommence.

Since the relays 23 and 30 may be controlled merely by voltage variations the currents interrupted by discs 35 to 40 may be made extremely small or in fact may be zero. There is consequently no sparking difficulties to be encountered by the circuit interruptions.

The embodiment of the invention which has been given herein has been selected merely for the purpose of illustrating in a simple way how the various features may be accomplished. It will be understood that the invention contained herein is susceptible of many other embodiments and adaptations depending upon the conditions and the results to be obtained.

What I claim is:

1. The combination of a source of direct current, an electroionic valve associated therewith and having a plurality of discharge paths, means for successively altering the discharge paths to create different drops of potentials, said means including an electromagnet acting upon each discharge path, an electroionic relay therefor provided with a controlling circuit and a controlled circuit in which the electromagnet is connected, an alternating current dynamo electric machine having primary windings associated with said valve and successively impressed with voltages in accordance with the variations in drop of potential of the discharges, a circuit closer in the controlling circuit of each relay intermittently actuated in accordance with speed variations of said machine, and transformers connecting the primary circuits with the controlled circuits whereby the duration of the discharge is affected by current variations in the primary windings.

2. The combination of a source of direct current, an electroionic valve associated therewith and having a plurality of discharge paths, means for successively altering the discharge paths to create different drops of potentials, said means including an electromagnet acting upon each discharge path, an electroionic relay therefor provided with a controlling circuit and a controlled circuit in which the electromagnet is connected, an alternating current dynamo electric machine having primary windings associated with said valve and successively impressed with voltages in accordance with the variations in drop of potential of the discharges, a circuit closer in the controlling circuit of each relay intermittently actuated in accordance with speed variations of said machine, and transformers connecting the primary windings with the controlling circuits whereby the duration of the discharge is affected by current variations in the primary windings.

3. The combination of an alternating current dynamo electric machine having primary windings, an electroionic valve associated with said windings, a direct current source associated with said valve, means for affecting the discharges of said valve whereby said source successively causes the impression of voltages upon said primary windings to produce a rotary field in the machine, and means linking the primary windings with said discharge affecting means thereby bringing the latter under the influence of the former to compensate for current variations therein.

4. The combination of an alternating current dynamo electric machine having primary windings, a transformer associated therewith, an electroionic valve having a plurality of discharge paths, a source of direct current for producing discharges in said valve, means for successively affecting said discharge paths whereby voltages are successively impressed upon the windings of said transformer to set up a rotary field in said machine, and transformers connecting the primary windings with said discharge affecting means to bring the duration of the discharges under control of current variations in the primary windings.

5. The combination of a source of direct current, an electroionic valve associated therewith and having a plurality of discharge paths, means including an electromagnet controlled by an electroionic relay and acting upon each discharge path for successively altering the discharge paths to create different drops of potentials, an alternating current dynamo electric machine having primary windings associated with said valve and successively impressed with voltages in accordance with the variations in the drops of potential of the discharges, and a circuit closer controlling the operation of each relay and intermittently actuated in accordance with speed variations of said machine.

6. The combination of an alternating current dynamo electric machine having primary windings, a transformer connected with said primary windings, a source of direct current, a plurality of sets of discharge electrodes associated with the transformer, and means including electromagnets controlled by electroionic relays for successively affecting the discharges between the sets of electrodes, thereby successively impressing voltages upon the transformer windings to set up a rotary field in the machine, the primary windings being inductively associated with the discharge affecting means to cause the duration of the discharges to be varied in accordance with the current variations in the primary windings.

7. The combination of a source of direct current, an alternating current dynamo electric machine having primary windings, a plurality of transformer windings connected to said primary windings, an electroionic valve having electrodes connected to said transformer windings and said source, means including electromagnets controlled by electroionic relays for affecting the discharges of said valves to successively produce different voltages in said transformer windings whereby voltages are successively impressed upon the various primary windings of the motor, the primary windings being inductively connected with the discharge affecting means to compensate for current variations in said windings and a tachometer for regulating said means in accordance with speed variations of the machine.

8. Regulating apparatus for a dynamo electric machine provided with primary windings and to be operated from a direct current source, having a plurality of sets of discharge electrodes for association with said primary windings and said source, means for successively altering the discharges between said sets of electrodes to vary the voltages impressed upon the said primary windings, and transformer windings through which the primary windings may be connected with the discharge altering means to impress corrective influence upon the machines in accordance with current variations in the primary windings thereof.

9. Regulating apparatus for an alternating current dynamo electric machine, having an electroionic valve provided with a plurality of discharge paths for association with the machine, discharge modifying apparatus for altering the discharges of said valve to produce a rotary field in said machine, and circuit changing mechanism for controlling said discharge modifying apparatus in accordance with speed variations of the machine, the discharge modifying apparatus being inductively connected with the machine for impressing corrective influences upon the machine in accordance with variations in the load current thereof.

10. Regulating apparatus for an alternating current dynamo electric machine, comprising an electroionic valve provided with a plurality of main discharge paths, electromagnetic windings associated with the main discharge paths of said valve and said machine, means including electroionic relays for causing said windings to successively alter the discharge paths and thus create a rotary field in the machine, and transformers for inductively connecting the machine and the electroionic relays whereby corrective influences may be impressed upon the machine to compensate for variations in the load current thereof.

11. Regulating apparatus for an alternating current dynamo electric machine, comprising an electroionic valve having a plurality of main discharge paths, electromagnetic means for controlling said discharge paths, and electroionic means for controlling said electromagnetic means, and inductive means for bringing the electromagnetic means under the influence of the load current of said machine to control the duration of the discharges.

12. The combination of an alternating current dynamo electric machine having primary windings, electroionic means provided with a plurality of main discharge paths for successively controlling the energization of said primary windings, and electroionic means for controlling said electroionic means, in accordance with speed variations of said machine, and transformer windings for inductively connecting the electroionic means with the primary windings whereby corrective influences may be impressed upon the machine in accordance with current variations in the primary windings.

13. The combination of a course of direct current, an electroionic valve associated therewith and having a plurality of discharge paths, means including an electromagnet connected in the controlled circuit of an electroionic relay and acting upon each discharge path for successively altering the same to create different drops of potential, an alternating current dynamo electric machine having primary windings associated with said valve and successively impressed with voltages in accordance with the variations in drop of potential of the discharges, a circuit closer in the controlling circuit of each relay and intermittently actuated in accordance with speed variations of said machine, and transformer windings in the controlling and controlled circuits of said relays and inductively connecting the primary windings therewith, whereby corrective influences are impressed upon the machine to compensate for current variations in the primary windings.

In witness whereof, I have hereunto subscribed my name.

FRIEDRICH WILHELM MEYER.